April 23, 1946.　　J. B. PARSONS　　2,398,852
VEHICLE WINDOW REGULATOR MOUNTING
Filed Jan. 3, 1944　　2 Sheets-Sheet 1
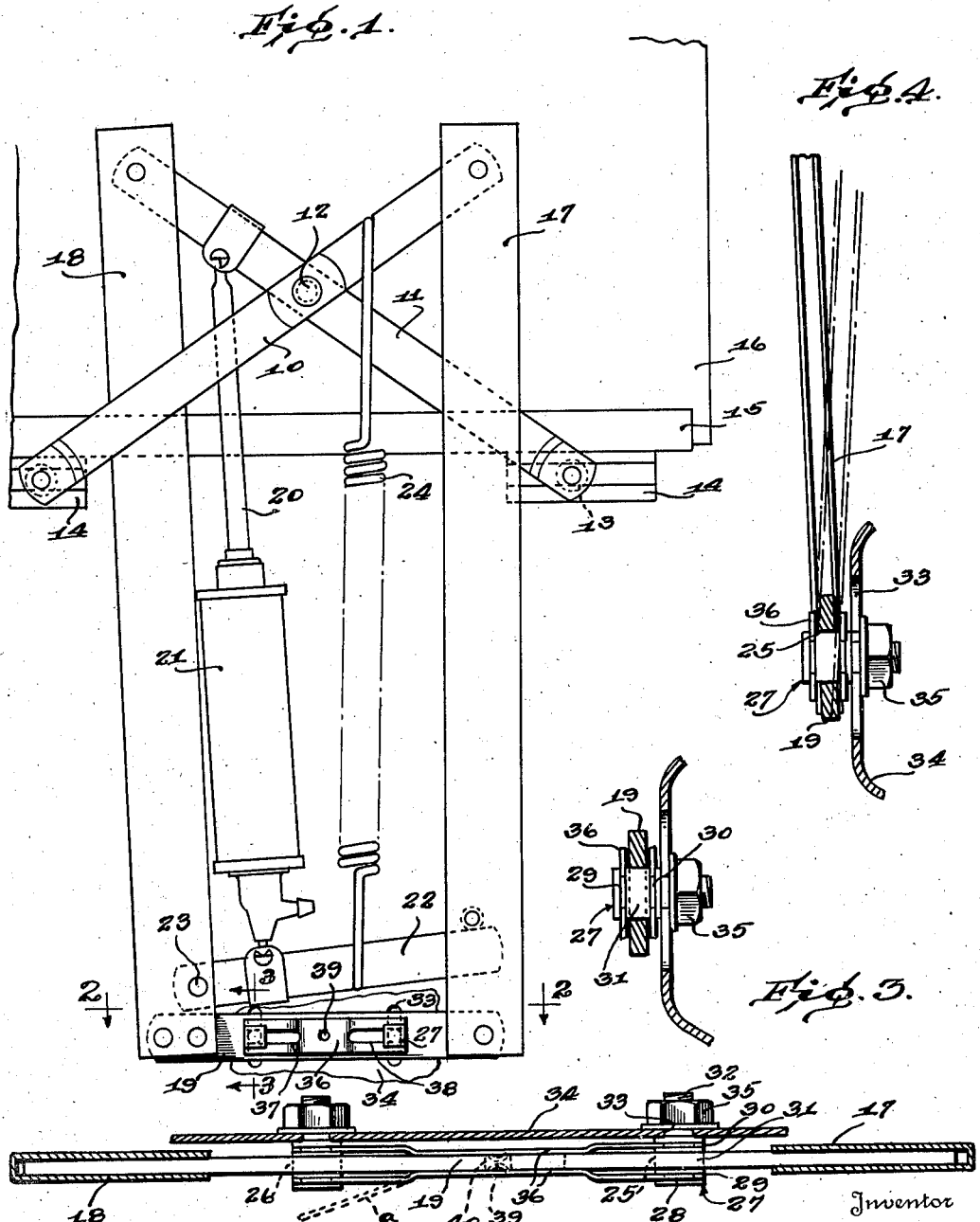
Inventor
John B. Parsons
By Malcolm W. Fraser
Attorney April 23, 1946. J. B. PARSONS 2,398,852
VEHICLE WINDOW REGULATOR MOUNTING
Filed Jan. 3, 1944 2 Sheets-Sheet 2

INVENTOR.
John B. Parsons
BY
ATTORNEY

Patented Apr. 23, 1946

2,398,852

UNITED STATES PATENT OFFICE 2,398,852

VEHICLE WINDOW REGULATOR MOUNTING

John B. Parsons, Toledo, Ohio

Application January 3, 1944, Serial No. 516,890

1 Claim. (Cl. 268—122)

This invention relates to regulator mechanisms particularly for use in the actuation of the windows of vehicles such as automobiles.

Ordinarily vehicle window regulators employed in connection with the actuation of the sliding type window panels are mounted in the well into which the window panel moves when actuated to open position. These regulators are usually fixedly mounted in the window well and slidingly engage the lower or inner edge portion of the window panel. Not infrequently, due to misalignment of the window channels which engage opposite side edge portions of the window panel, or to the conformation of the vehicle body resulting in the window panel being out of alignment or angularly disposed with respect to the operating parts of the regulator mechanism, difficulty is encountered in obtaining an easy operating mechanism. Then, too, in some cases in order to approach the desired position of alignment, the vehicle body structure must be so designed as to compensate and as a result, thicker doors are necessitated, thereby detracting from the roominess of the interior of the body. It is a desideratum to provide an arrangement by which the regulator mechanism and the window panel are arranged in the desired position of alignment throughout the window travel, the arrangement being such that the regulator mechanism can be readily and simply installed and will automatically compensate for irregularities or misalignment and will automatically conform as much as possible to the position of the window panel during its movement from one position to another.

An object is to produce a mounting for a window regulator mechanism which will in an efficient manner, overcome the above difficulties by enabling the regulator mechanism bodily to move in response to changes in the position of the window panel.

Another object is to produce a window regulator mechanism which will automatically accommodate itself to different positions transverse to the direction of movement of the window panel in order to align itself as nearly as possible with the window panel throughout the latter's movement.

A further object is to produce a mounting for window regulator mechanism which enables the latter to rock automatically in response to changes in position of the window panel during the movement of the latter.

A still further object is to produce a mounting for a vehicle window regulator mechanism which includes a spring device tending normally to hold the regulator mechanism in a predetermined position but which is yieldable in response to different positions of the window panel thereby to facilitate the operation of the mechanism.

A still further object is to produce a window regulator structure mounted between the vehicle window glass and the outer door or vehicle body panel.

Other objects and advantages of the invention will hereinafter appear, and for purposes of illustration but not of limitation, an embodiment of the invention is shown in the accompanying drawings in which Figure 1 is a side elevation of a window regulator mechanism operatively connected to a window panel and showing the mounting therefor;

Figure 2 is an enlarged sectional view on the line 2—2 of Figure 1;

Figure 3 is an enlarged sectional view on the line 3—3 of Figure 1;

Figure 4 is an enlarged vertical sectional view illustrating by broken lines the manner in which the regulator can rock laterally with respect to the direction of movement of the window panel;

Figures 5, 6:
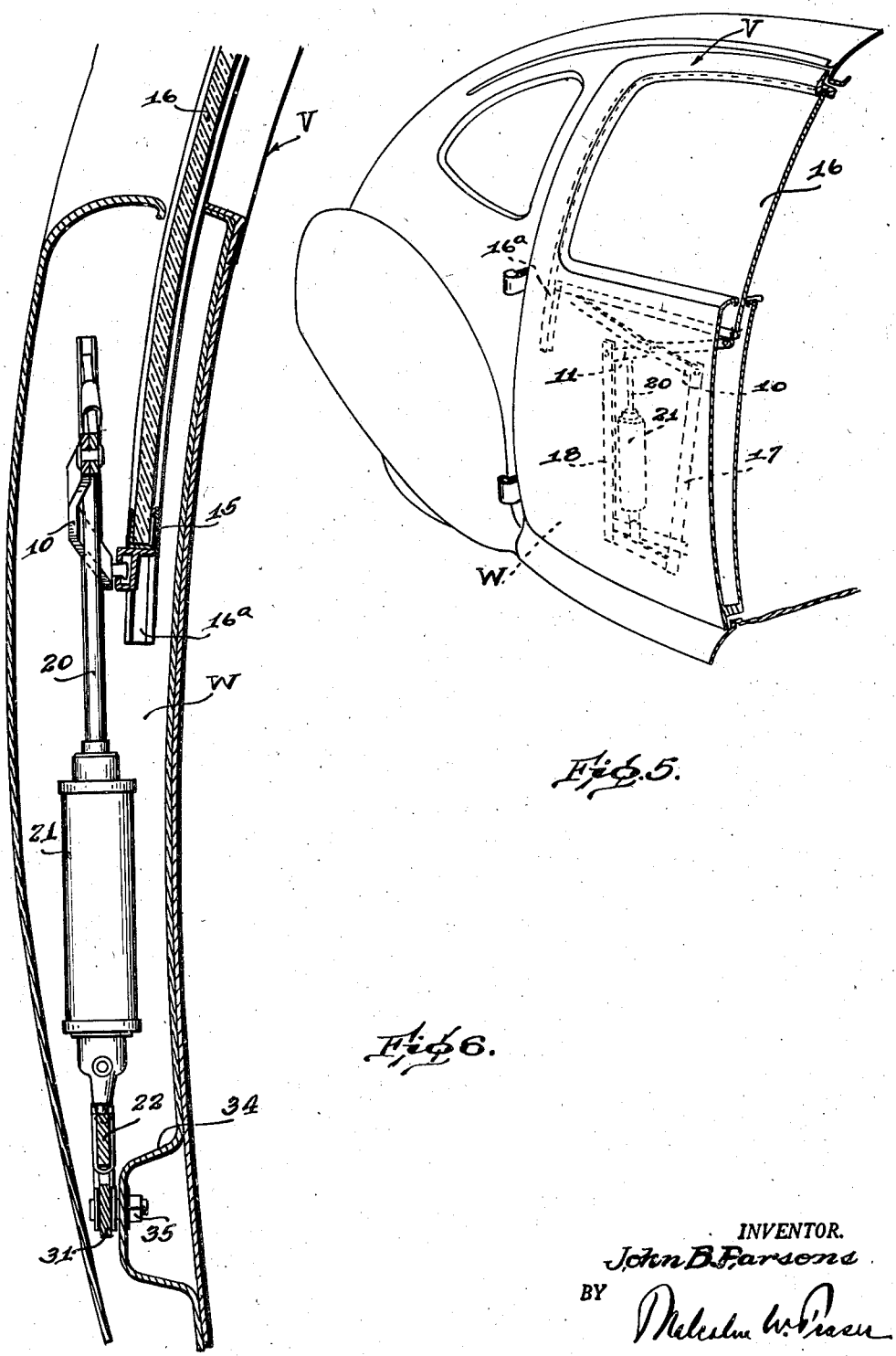
Figure 5 is a fragmentary view of a portion of an automobile body some parts being shown in section and showing the regulator mechanism mounted within the door.
Figure 6 is an enlarged vertical sectional elevation taken through the vehicle door and showing the relative arrangement between the regulator mechanism and the window glass.

The illustrated embodiment of the invention comprises a regulator mechanism including a pair of crossed arms 10 and 11 which are pivoted together by a rivet 12. On the outer ends of the arms 10 and 11 is a stud 13 which slidingly engages a horizontally slotted retainer 14 which is fixed to and depends from a channel 15 embracing the lower edge of the window glass panel 16. The window panel 16 is guided for up and down sliding movement by the usual channel guides 16a at the sides of the window opening and in the lowered position of the window panel, the latter enters a well W (Figure 6) formed in the vehicle door or vehicle body as the case may be. This structure is well-known to those skilled in this art.

The cross arm regulator consisting of the arms 10 and 11, has inner ends pivoted to the upper ends of upright frame arms or stanchions 17 and 18. The lower end of the stanchions 18 is rigidly fixed to a cross bar 19 and the lower end of the stanchion 17 is pivotally connected at its lower end to the opposite end of the cross bar 19. As indicated on Figure 2, the stanchions 17 and 18 are U-shaped in cross section, being of relatively light gauge metal folded upon itself and the cross arms 10 and 11 as well as the bar 19 are secured between the sides of the stanchions as indicated.

For imparting raising or closing movement to the window panel 16, a piston rod 20 is connected to the arm 11 and has at its inner end, a piston (not shown) slidable in a cylinder 21, the lower end of which is secured to an arm 22 which is pivoted at 23 to the stanchion 18. Manifestly by introducing liquid under pressure to the lower end of the cylinder 21, the piston rod 20 is forced upwardly thereby imparting upward swinging movement to the cross arms to impart the raising or closing movement to the window panel. In any suitable manner, the liquid within the cylinder 21 is trapped when the desired movement has been obtained, thereby to hold the window in the desired position.

An helical coil spring 24 has one end hooked over the regulator arm 10 and the opposite end hooked over the pivoted mounting arm 22. By allowing the liquid to flow from the cylinder 21, it will be manifest that the coil spring 24 causes the window panel 16 to move downwardly or towards its open position, thereby lowering the window panel 16 into its well. Reference is hereby made to my co-pending applications Serial Nos. 485,871 and 452,864 for more detail description of the structure and operation above outlined.

In accordance with this invention, the regulator mechanism is so mounted that it can move in a plane transverse to the direction of movement of the window panel 16, thereby to enable the regulator mechanism automatically to accommodate itself to such lateral movement of the window panel. This is important not only to compensate for irregularities in the guide channels but also for structures in which the window panel and the regulator mechanism are somewhat out of alignment due either to inaccuracies in construction or to uniqueness of design in which it is intended that the window panel move angularly or to positions out of general alignment with the regulator mechanism. In this manner operation of the regulator mechanism is facilitated and the cramping or binding between the regulator and the window panel is obviated.

As shown, the cross bar 19 is formed with a pair of laterally spaced rectangular holes 25 and 26 through which extend bolts 27 respectively. Each of the bolts 27 has a square head 28 formed with a pair of notches 29 and 30 which extend entirely around the head. The portion 31 of each bolt intermediate the notches 29 and 30 is rectangular and is disposed within the aperture 25 or 26 in the bar 19. The rectangular aperture 26 is slightly larger than the bolt portion 31 to enable the bar 19 to rock or pivot as indicated on Figure 4. The bolt 27 is formed with an annular screw-threaded end portion 32 which fits an opening 33 in the supporting panel 34 which may be a separate piece or a part of the vehicle body. The aperture 33 is vertically elongate to afford initial vertical adjustment of the regulator mechanism. A nut 35 on the screw-threaded portion 32 rigidly clamps the bolt in position.

A pair of spring elements 36 are arranged on opposite sides of the cross bar 19. These spring elements are of relatively thin spring metal and each is formed with notches 37 and 38 disposed at opposite ends and a central inwardly extending embossure 39. Normally both ends of the spring elements flex outwardly as indicated at a on Figure 2. Each of the spring elements are assembled in the same manner so that description of one will suffice. In the first instance, one end of a spring element 36 is flexed inwardly and the notched end 37 of the spring is slid over the notched portion 29 of one bolt head 28 a sufficient distance so that the free end of the notch 38 can be moved into engagement with the notch 29 of the other bolt head. Thereafter, the spring element 36 is shifted laterally until the embossure 39 enters a hole 40 arranged approximately centrally of the cross bar 19. The engagement between the embossure 39 and the aperture 40 holds the springs against displacement.

Owing to the conformation of the spring, it will be apparent that the bolt portions 31 are disposed approximately centrally of the apertures 25 and 26, but inasmuch as the openings 25 and 26 are larger than the bolt portion 31, the cross bar 19 and the regulator mechanism connected thereto is capable of rocking movement in one direction or the other laterally of the directions of movement of the window panel 16. In this manner, the regulator mechanism is capable of automatically conforming to the changes in position of the window panel laterally of its direction of movement or of the opening and closing movements imparted to it by the regulator mechanism. The spring elements 36 are also important in preventing noise provoking rattles or jars.

From the above description, it will be manifest that the regulator mechanism is so flexibly mounted that it can automatically shift its position during the actuation of the window panel in order to conform with it. Some of the advantages of such mounting have been hereinbefore mentioned, but in addition, it should be pointed out that this structure lends itself admirably to the actuation of a curved window, such as the window 16 shown on Figures 5 and 6, or a window which instead of lying in a single plane is of curved formation to conform, for example, to the side of the vehicle V. Windows of that character have been contemplated heretofore, but one important reason why they have not been adopted lies in the difficulty of operating them. The ordinary type of regulator could not accommodate them due to their rigid fixation.

It should be further pointed out that the ordinary vehicle window regulator must of necessity be fixedly mounted in a position on the inside of the window panel to enable its operation by a handle disposed on the inside of the door or body structure. As a consequence, a certain thickness or depth of the door or body structure must be maintained for this purpose. The above described window regulator can advantageously be mounted on the outside of the window structure 16, as indicated on Figure 6, or between the window and the outside door or body panel, since it is unnecessary to provide a crank handle in accordance with the usual method. By so mounting the regulator mechanism, the thickness of the door or body structure can be reduced and as a result, the roominess of the vehicle increased by several inches. Automobile body designers are constantly striving to make more roomy the interior of their vehicles and a regulator mechanism as above described, in an exceedingly simple manner enables what is regarded as a substantial increase in the interior.

It is to be understood that numerous changes in details of construction, arrangement and operation may be effected without departing from the spirit of the invention especially as defined in the appended claim.

What I claim is:

The combination with a movable closure member of a window structure, a window regulator unit having mechanism for moving said closure member, and a supporting frame for said mechanism including a pair of laterally spaced upright members alongside of which said closure member is adapted to move, and a substantially horizontal member connected to said upright members, of a mounting for said regulator unit operable to permit tilting movement bodily of said unit transversely of and in directions toward and away from and during movement of said closure member, said mounting including a support, a pivot element for said unit rigid with said support and extending transversely of said horizontal member, and yieldable means carried by said pivot element upon opposite sides of said horizontal member and operable to take up play and prevent rattling between said horizontal member and pivot element.

JOHN B. PARSONS.